AMPLITUDE MODULATION TO SINGLE OR DOUBLE SIDEBAND SUPPRESSED CARRIER CONVERTER

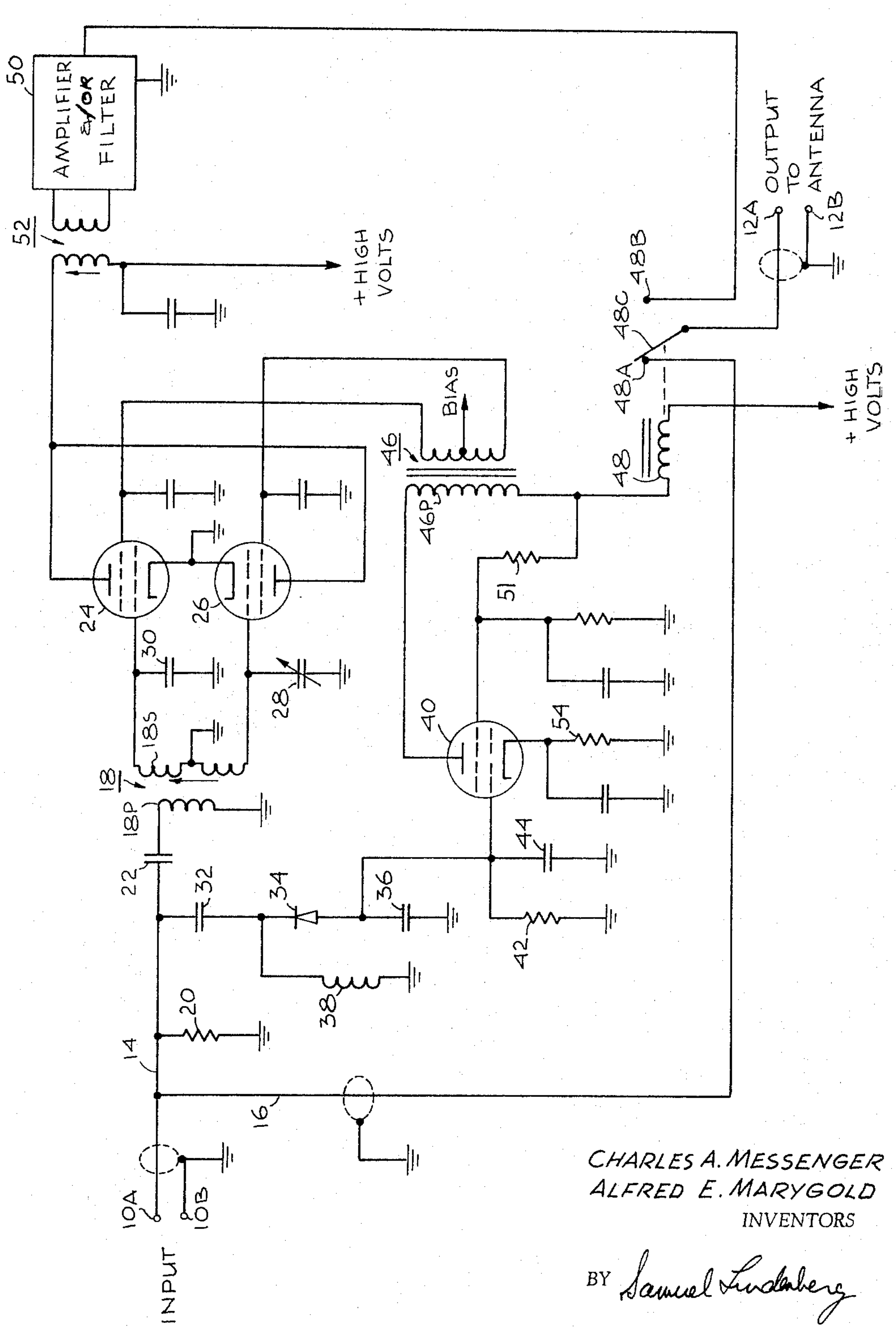
CHARLES A. MESSENGER
ALFRED E. MARYGOLD
INVENTORS
BY Samuel Lindenberg
ATTORNEY 3,284,711

Charles A. Messenger, North Hollywood, and Alfred E. Marygold, Burbank, Calif., assignors to General Radiotelephone Company, Burbank, Calif., a corporation of California Filed Apr. 8, 1963, Ser. No. 271,341
3 Claims. (Cl. 325—103)

This invention relates to single or double sideband converters and more particularly to improvements therein.

There has been an increased popularity in transmitters of the type which use either a single or a double sideband suppressed carrier mode of transmission. In systems of this type it is desired to suppress the carrier and permit either one or both sidebands to be transmitted. The modification of an amplitude modulated radio frequency transmitter, in order to convert it to single or double sideband suppressed carrier transmission, is one which requires extensive circuit alterations and is quite expensive. Effectively, what has had to be done heretofore is to completely rework the section of the transmitter from the modulators on out for effectuating the desired transmitting mode. Accordingly, heretofore, if the suppressed carrier type of transmission was desired, then instead of reworking the old transmitter, in many cases, a new one was purchased.

An object of this invention is to provide a simple attachment for a transmitter which converts the transmitter to a single or double sideband suppressed carrier mode of transmission without requiring meddling with the transmitter internal circuits.

Yet another object of the present invention is the provision of a simple and inexpensive converter for converting an amplitude modulated transmitter to a single or a double sideband suppressed carrier transmitter.

Still another object of the present invention is to provide a unique circuit arrangement for converting an amplitude modulated radio frequency signal to a single or a double sideband suppressed carrier signal.

These and other objects of this invention are achieved in a circuit, in accordance with this invention, which is connected between the transmitter output and the antenna terminals. This circuit includes an input section having a balanced modulator circuit to which a portion of the frequency modulated carrier or amplitude modulated carrier output of the transmitter is fed. A second portion of the transmitter output is fed to a circuit which derives the modulation signals therefrom and converts the modulation signals into push-pull signals. The push-pull signals are fed into the balanced modulator which now has all the operating signals required to produce a double sideband suppressed carrier output. This is fed to the antenna for radiation. If single sideband suppressed carrier signals are desired then one of the sidebands may be removed by using a suitable filter inserted between the output of the balanced modulator and the antenna.

The novel features that are considered characteristic of this invention are set forth with particularity in the appended claims. The invention itself, both as to its organization and method of operation, as well as additional objects and advantages thereof, will best be understood from the following description when read in connection with the accompanying drawing, which is a circuit diagram of an embodiment of this invention.

Reference is now made to the drawing which is a circuit diagram of the embodiment of the invention. This circuit has a pair of input terminals 10A, 10B, one of which, 10B, is grounded, and a pair of output terminals 12A, 12B, one of which, 12B, is grounded. This circuit has its input terminals connected to the output of a transmitter and its output terminals connected to the antenna. Thus, the input to the embodiment of the invention comprises an amplitude modulated radio frequency carrier. These signals are applied to the input terminals 10A and 10B. Terminals 10A and 10B are connected to shielded cable lines 14, 16, one of which, 14, connects to primary winding 18P of a transformer 18.

Resistor 20, which is connected between the line 14 and ground, serves as a load termination. The capacitor 22, which is effectively in series with the primary winding 18P, operates to couple some of the input signal to the balanced modulator. The center tapped winding 18S is connected to the control grids of the respective balanced modulator tubes 24, 26. Variable capacitor 28 and capacitor 30 are connected between the respective tube control grids and ground and permit the making of a fine adjustment for carrier suppression.

A capacitor 32, a diode 34, and another capacitor 36, are connected in series with one another and between the line 14 and ground. A radio frequency choke 38, is connected between the junction of capacitor 32 and diode 34 and ground. The junction of diode 34 and capacitor 36, is connected to the control grid of a tube 40. A resistor 42, and a capacitor 44 are connected between the control grid of tube 40 and ground. The plate of tube 40 is connected to one end of the primary winding 46P of an audio transformer 46. The other end of this primary winding 46P is connected to a relay winding 48, which in turn is connected to a high potential source. The relay winding 48 is of the single-pole double-throw type. One of its contacts, 48A, is connected to line 16 and to the input from the transmitter. The other of its contacts, 48B, is connected to receive the output of an amplifier and/or filter circuit 50. If double sideband transmission is desired, then filter in the amplifier and/or filter circuit 50, is omitted. If single sideband transmission is desired than a filter is included which removes one sideband. The swinging arm 48C of the relay is connected to the output terminal 12A.

The screen grid of tube 40 is connected through a resistor 51 to the end of the primary winding, 46P, which is connected to the relay winding 48. The cathode of tube 40 is connected through a resistor 54 to ground.

In the standby or quiescent state, a tube 40 is biased conducting by virtue of the arrangement shown. At that time relay 48 is operated and the swinger arm 48C is connected to the relay contact 48A whereby the antenna is connected directly to the output of the transmitter. As soon as any output occurs from the transmitter, some of this energy is applied to the balanced modulator, and some of this energy is applied to capacitor 32, to the diode 34. Diode 34, serves the function of providing some operating bias for tube 40. That is, it rectifies the signal applied thereacross and tube 40 is rendered sufficiently less conductive in response thereto to draw an insufficient amount of current to maintain relay 48 in its operating state. As a result, the swinger arm 48C, connects to the contact 48B, whereby the output of the amplifier and filter 50, is applied to the antenna terminals. Diode 34, and the associated circuitry also serves as a demodulator, and the modulation signals which are derived may be applied to the control grid of tube 40 which now operates as an amplifier. If the demodulated signals are audio, the amplifier is an audio amplifier. The output of tube 40 is applied to the primary 46P of the transformer 46. The transformer 46 has a center tapped secondary winding, the outer ends of which are respectively connected to the screen grids of the balanced modulator tubes 24, 26. Thus, audio transformer 46 supplies push-pull audio voltage to the balanced modulators which now have all the operating signals required to produce a double sideband suppressed carrier output. The anodes of tubes 24 and 26, are connected together and to the primary of an output transformer 52. The secondary winding of the output transformer 52 is connected to the amplifier and filter circuits 50, which as previously described, is now connected through relay contacts 48B and swinger arm 48C to the antenna terminals.

From the foregoing description it will be apparent that there has been provided a novel and simple circuit arrangement which can be connected between the output terminals of the transmitter and its antenna, thereby converting the AM output of the transmitter to either single or double sideband suppressed carrier signals. In accordance with this invention there is no necessity for going into the transmitter circuits for accomplishing the transmitter conversion. While vacuum tubes are shown being used, this is by way of illustration and not as a limitation on the invention since those skilled in the art may replace these with solid state devices without departing from the spirit and scope of this invention.

We claim:

1. A circuit for converting amplitude modulated radio frequency carrier signals to double sideband suppressed carrier signals comprising input terminals to which said signals to be converted are applied, a balanced modulator comprising first and second tubes, each having a cathode, a control grid, a screen grid and anode electrodes, a transformer having a primary winding and a center tapped secondary, winding means connecting said input terminals to said primary winding, means connecting the respective ends of the center tapped secondary winding to the respective control grids of said first and second tubes, means for tuning said transformer to the frequency of said radio frequency carrier signals, means connecting the cathodes of said first and second tubes together, diode demodulator means, means for connecting said diode demodulator means to said input terminals to demodulate the signals applied to said input terminals, means for converting said demodulated signals to push-pull signals, means for connecting the push-pull signals to the screen grids of said first and second tubes, a common output load, and means for connecting the anodes of said first and second tubes to said common output load.

2. A circuit for converting amplitude modulated radio frequency carrier signals to sideband suppressed carrier signals comprising input terminals to which said signals to be demodulated are connected, diode means connected to said input terminals for demodulating the modulated signals applied thereto, an amplifier, an audio transformer having a primary winding and a push-pull secondary winding, a relay coil, means connecting said relay coil and the primary of said audio transformer in series with said amplifier, means for biasing said amplifier to be sufficiently conductive to maintain said relay operated, said relay having two contacts and a common swinger arm, said common swinger arm connecting with one of said contacts when said relay is operated and with the other of said contacts when said relay is not operated, output terminals, means connecting said common swinger arm to said output terminals, means connecting said one of said relay contacts to said input terminals, means connecting said diode means to said amplifier for reducing the conductivity of said amplifier whereby said relay is rendered inoperative and push-pull demodulated signals appear at the secondary winding of said transformer, a balanced modulator, means connecting the output of said secondary winding of said audio transformer to said balanced modulator means, including a transformer tuned to the frequency of said radio frequency carrier signals, coupling said input terminals to said balanced modulator whereby there is obtained a double sideband suppressed carrier output from said balanced modulator, and means for connecting said balanced modulator output to said other of said relay contacts.

3. A circuit as recited in claim 2 wherein said means for connecting said balanced modulator output to said other of said relay contacts includes a single sideband filter means for permitting only single sideband suppressed carrier signals to be applied to said other of said relay contacts.

References Cited by the Examiner

UNITED STATES PATENTS

| | | | |
|---|---|---|---|
| 1,790,486 | 1/1931 | Roberts | 325—49 |
| 2,136,479 | 11/1938 | Trevor | 332—1 |
| 2,416,831 | 3/1947 | Hings | 325—181 X |

OTHER REFERENCES

Pages 49–51 and 182, November 1957—West, Conversion of AM Transmitters to DSB Operation CQ, vol. 13, No. 11.

Pages 712 and 713, 1947—Cruft Electronics Staff, Electronic Circuits and Tubes. McGraw-Hill, N.Y., N.Y.

DAVID G. REDINBAUGH, *Primary Examiner.*

B. V. SAFOUREK, *Assistant Examiner.*